United States Patent
Cauldwell

[11] 3,908,165
[45] Sept. 23, 1975

[54] FIELD STRENGTH METER
[75] Inventor: Jack D. Cauldwell, Dayton, Ohio
[73] Assignee: Arvin Industries, Inc., Columbus, Ind.
[22] Filed: June 10, 1974
[21] Appl. No.: 477,776

[52] U.S. Cl. ............... 324/77 A; 324/98; 324/126; 325/67
[51] Int. Cl.² .................. G01R 17/00; G01R 23/16
[58] Field of Search .......... 324/126, 128, 98, 99 D, 324/77 A; 325/67, 363

[56] References Cited
UNITED STATES PATENTS
2,522,369   9/1950   Guanella .......................... 324/128
3,284,709   11/1966   De Paola ........................... 324/98
3,634,763   1/1972   Micale ............................. 324/99 D

*Primary Examiner*—Alfred E. Smith
*Assistant Examiner*—Ernest F. Karlsen
*Attorney, Agent, or Firm*—Biebel, French & Bugg

[57] ABSTRACT

A signal strength meter indicates signal level directly in dBmV. The signal under test is attenuated to a level which centers a meter indicator, and the attenuator movement is translated into numerical direct reading information of signal level. Push button switches select a channel for testing, and each switch incorporates gain compensation for the frequency of the signal to be tested. Within each channel the operator can select between audio and video carrier frequency.

12 Claims, 4 Drawing Figures

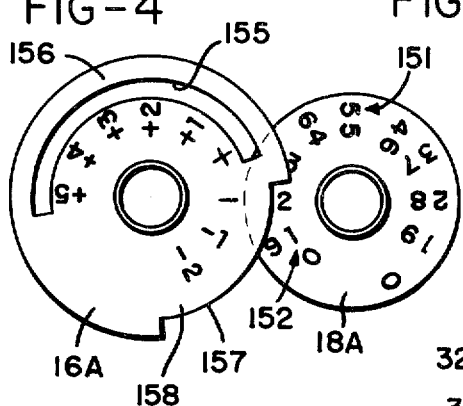
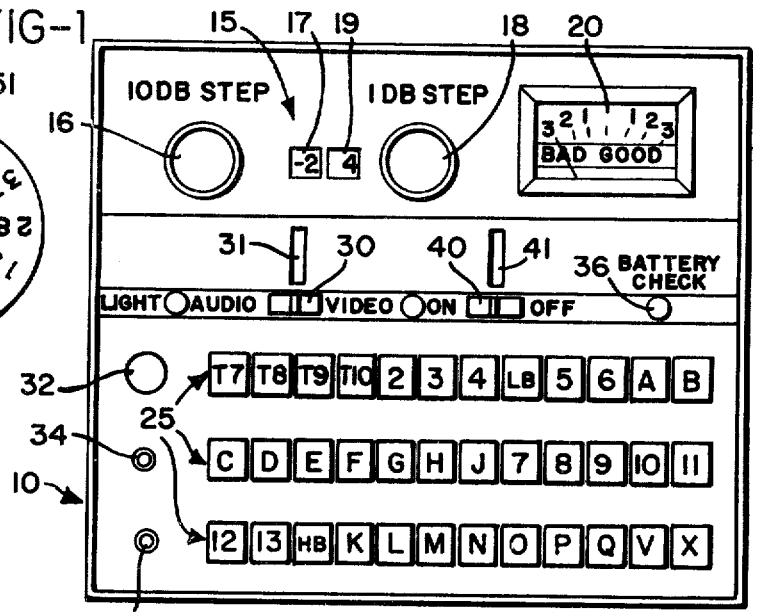
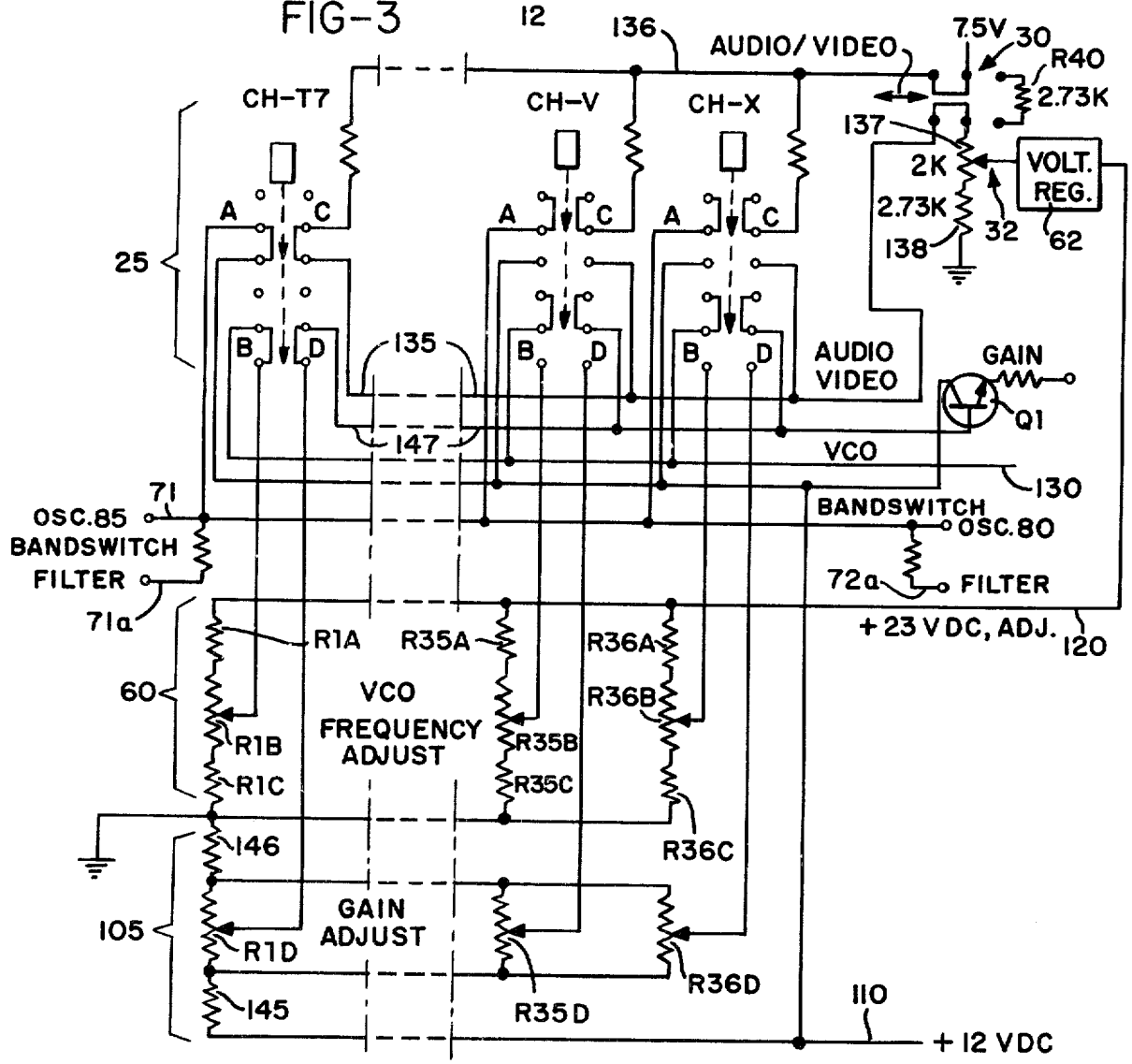

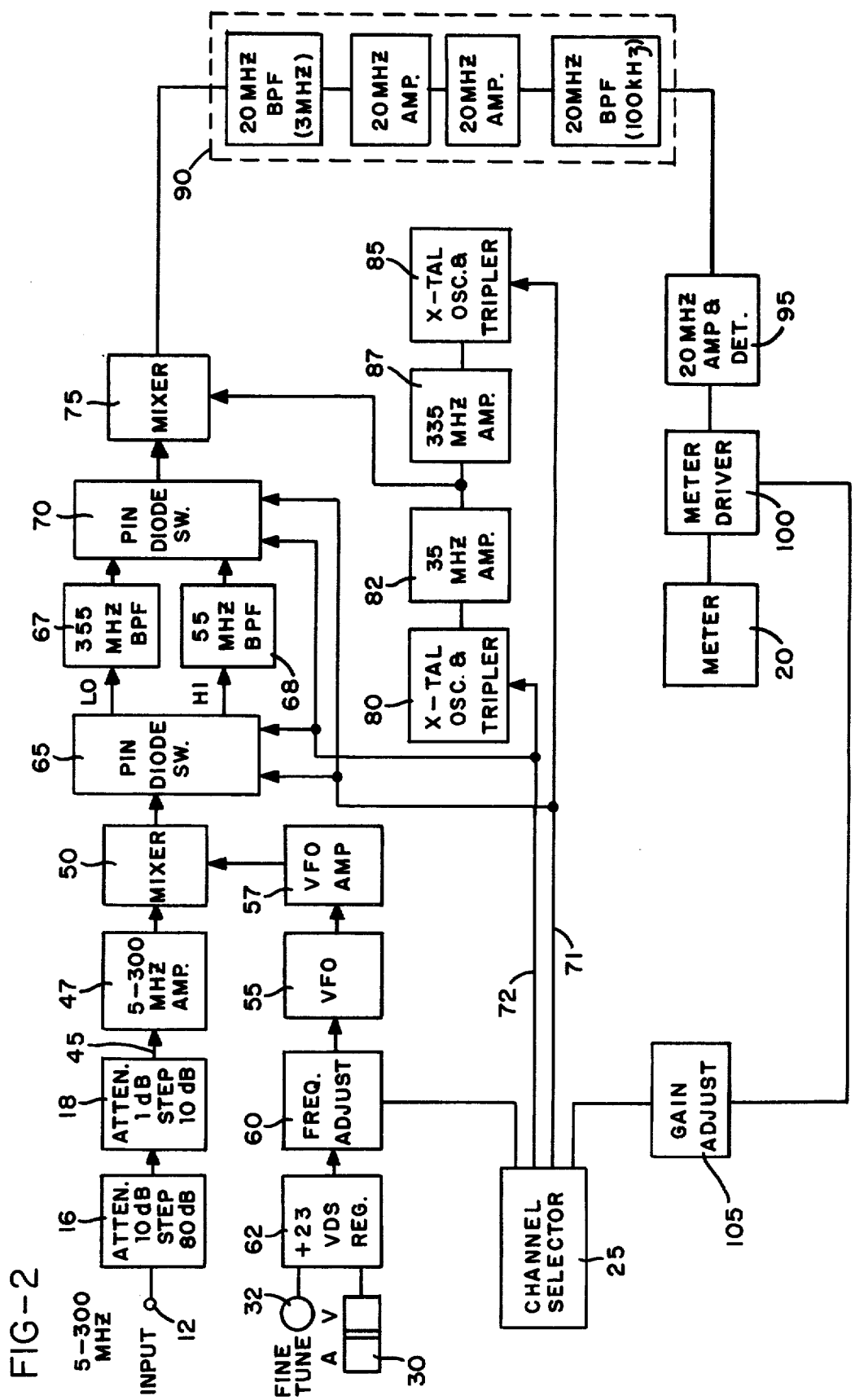

FIELD STRENGTH METER

BACKGROUND OF THE INVENTION

This invention relates to a signal level instrument which is useful in accurately determining the level or amplitude of various R.E. signals. There are a number of uses for such instruments, the most prevalent of which is in connection with the testing and alignment of cable television signals. A technician must verify the level of signal present at various points in the cable system, for example at all the terminals, junctions, etc., and due to this he often must carry a portable instrument up a pole to some connection point, attach a probe or lead of the instrument, and then use the instrument to check the signal level on all of the various channels available in the system.

At present the Federal Communications Commission requires 20 channel capability of cable television systems, thus the technician may have to check the signal level in that many different channels, or more, depending upon the capacity of the system. In addition, these systems utilize a low band pilot signal, typically around 75 MHz, and a high band pilot signal which is typically in the order of 180 to 300 MHz to keep the system balanced. The pilot signals provide fixed references against which the trunk line amplifiers can automatically adjust to maintain an essentially constant level over a wide range of temperature conditions. These pilot signals must also be checked for signal level.

In different cable television systems, some channels may be provided below the lowest VHF channel (channel 2), on which additional television and/or communication signals can be provided. These are commonly referred to as the "sub-low" channels. They are also sometimes used for two-way communication within the system, for example where local live television signals may be originated in the system's area, transmitted on one of the sub-low channels to the antenna and processor, and then converted to be transmitted back into the system on one of the unused VHF channels.

In addition, a number of "mid-band" channels are available within the VHF spectrum, between channels 6 and 7 together with so-called "super-band" channels above the frequency of VHF channel 13. Both the mid-band and super-band channels can be used for video or data transmission within the system. By way of example, a subscription type adapter can be used to receive and decode special programs such as movies transmitted on these channels.

In all, a signal level instrument may be required to have a total band width encompassing some 36 different channels, and it may be necessary for the technician to check individually the signal level on a large precentage of these. Present instruments used for this purpose provide a calibrated meter from which the technician must read a signal level value, especially in the range of 0-20 dBmV, which must be subtracted from the attenuation setting manually preset into the instrument through a bandswitch. This value must be compensation, by use of a chart from which a compensation adjustment is set into the instrument, depending upon the frequency of the instrument, depending upon the frequency of the signal being tested. Thus, when the technician must perform these operations, with the presently used instruments, while on a pole, and make the necessary adjustments, recordings, calculations, etc., there is considerable chance for error to be introduced in the recorded values. Furthermore, although gain compensation may be built into such instruments, it has been common practice to compromise the gain compensation over the range of the instrument, in which case the compensation may not be precisely accurate for any given channel.

SUMMARY OF THE INVENTION

The present invention provides a novel and convenient signal level instrument which is completely portable, having capability of handling 36 channels encompassing the VHF television spectrum, including the low-band and high-band pilot signals, and the sub-band, mid-band and super-band channels. Each channel can be selected with a separate push button operated switch. Within each selected channel, a further selection can be made between carrier frequency of video and audio signals where such are present in the particular channel under test. Instead of reading a value from a meter scale, this instrument provides a centering or null type meter which the operator needs only to adjust to a predetermined reading position. The value of the signal level is read out digitally, direct reading, with gain compensation automatically included and individually calibrated for the frequency of the same channel under test. The digital readout remains in view of the operator until he begins the next test operation.

To use the instrument, it is necessary for the operator only to
 a. depress the appropriate channel push button
 b. adjust a pair of attenuators until he observes a predetermined indication on the meter and
 c. read the signal level in dBmV directly from a digital readout coupled to the attenuator.

Therefore, the operator need only select the channel, manipulate the attenuator controls to obtain center reading on the meter, and then record the value shown on the digital readout. Where there is a television signal on the particular channel, including audio and video signals, the operator need only adjust a selector switch from video to audio positions, and adjust the attenuator controls each time, in order to check separately the signal levels at the carrier frequencies of both the audio and video signals within the channel under test.

The basic instrument incorporates a two-step attenuator control, arranged in decade fashion with the input signal being connected first through an adjustable attenuator which operates in 10 db steps, then through a second attenuator which operates in 1 db steps. The attenuated signal is fed to a mixer, which also is fed from a variable frequency oscillator, preferably a voltage controlled oscillator. Basically, the function of the instrument is to attenuate the signal under test to a predetermined level, then with the mixer provide a reference signal(s) which is at the predetermined attenuated level and a predetermined frequency or frequencies.

The push button operated channel selector performs two basic functions, it selects and provides a control voltage signal which determines the frequency of a voltage controlled oscillator, and it also provides a gain adjustment which is unique to the selected channel and is applied to a driver amplifier which in turn drives the indicating meter. Thus, selection of a particular channel provides individually calibrated compensation for that channel to the meter driver, and also sets the frequency of the voltage controlled oscillator such that in the mixer the attenuated signal under test is mixed (down or up), to one or more intermediate frequencies. These signals are then further processed and supplied to the meter driver amplifier.

Digital indicators are controlled by the manual adjustments for the attenuators, thus providing a digital indication of the amount of attenuation necessary to drive the meter to a predetermined position, preferably a center reading or null position. Preferably these indicators are cooperating dials on a stepwise rotatable attenuator controls. These dials cooperate with viewing windows to provide a digital readout which is a direct reading of R.F. level information in dBmV, plus or minus.

Due to the substantial frequency range of the instrument, it has been found desirable to utilize two different reference frequencies from the mixer, and this is achieved by either subtracting the oscillator frequency from the test signal frequency, or adding the two frequencies. Suitable switching devices are provided under the control of the channel selector so that appropriate band pass filters are connected to the mixer output, depending upon which of the two output frequencies is being used. The output of the band pass filter is then supplied to a second mixer, and one of two fixed frequency oscillators is enabled to supply the second mixer, thereby reducing the reference signal to a second, single intermediate frequency, having a signal level directly related to the level of the originally attenuated signal. This technique reduces the frequency range required for the variable controlled oscillator and the mixer. The output of the second mixer is then processed in conventional fashion and fed to the meter driver amplifier.

It should be noted that this instrument, or one using the same principles, can also be utilized to test the level of radiated fields, as from radio or television transmitters, by connecting the output of a suitable portable antenna to the input connector, as through an appropriate amplifier.

The direct reading digital indicator also incorporates unique features. The attenuator control knobs also move cooperating numbered dials which present numerals behind adjacent viewing windows. The dial of the higher order knob overlaps the lower order dial, and is provided with radially displaced arcuate transparent segments that selectively uncover one of two different numeral rows on the lower order dial. Those two rows of lower order numerals read in reverse of each other. The numerals on the higher order dial read plus and minus, and the segments are related to these such that different lower order rows actually present numerals, depending on the setting of the higher order dial.

Therefore, the principal object of the present invention is to provide a novel wide range signal level test instrument which is simple to operate, and which provides a direct digital readout of signal level information; to provide such an instrument in which a meter is used for center or null reading only, to determine when the proper digital readout appears at the indicator; to provide such an instrument in which each channel under test can be individually selected by separate push button operated switches, and a separate switching circuit can be used to distinguish between audio and video signals to be tested within a given channel, up to a capacity of thirty-six different channels; to provide such a meter which is fully portable, battery operated, and in which the meter can also be used to test battery condition as a separate function; to provide such an instrument in which individually calibrated gain compensation is provided for each channel; and to provide such a meter in which the signal under test is attenuated to a predetermined level, and the manipulation of the attenuator directly operates a digital readout mechanism that can provide information in plus or minus dBmV.

Other objects and advantages of the invention will be apparent from the following description, the accompanying drawings and the appended claims.

BRIEF DESCRIPTION OF THE DRAWINGS

FIG. 1 is a front view of the meter housing and controls;

FIG. 2 is a block diagram of the signal level test instrument;

FIG. 3 is a schematic diagram of the push button switching controls and related circuits; and FIG. 4 is a view showing the digital readout mechanism operated between attenuator controls.

DESCRIPTION OF THE PREFERRED EMBODIMENT

Referring now to the drawings which show a preferred embodiment of the invention, and particularly to FIG. 1, where a signal level measuring instrument 10 is shown, the signal to be measured is connected to an input connector 12 where the signal passes to an attenuator, shown generally at 15. The attenuator includes a 10 db per step device 16 and associated indicator window 17, and a 1 db per step device 18 with its indicator associated window 19. A meter 20 is used to assist the operator in adjusting the attenuator 15.

The channel undergoing analysis is selected by one of 36 push button switches shown generally at 25. These switches preferably are arranged in three rows of 12 switches each. The switches which select those channels having a frequency within the range of VHF television stations, i.e., channels 2–6 and channels 7–13, may be of a different color than the remaining switches, and another color may be used for the buttons which select the low-band and high-band pilot signals (LBF and HBF).

The operator may select, by means of switch 30, either the audio or the video portion of the signal in each channel. The position of this switch is visually indicated in window 31. A fine-tuning control 32 is also provided, along with a video output jack 34.

The signal level instrument is battery powered, and a battery test switch 36 may be used in conjunction with the meter 20 (using its "Bad-Good" scale) to test the condition of the batteries. The circuit for this is conventional and thus not shown. An on/off power switch 40 is also provided, and its position is indicated in window 41.

Reference is now made to the block diagram shown in FIG. 2. The cable terminal, or junction undergoing test is connected to input terminal 12 where it passes to attenuator 16 which attenuates the signal in 10 db steps up to a maximum of 8 db. The signal then passes through attenuator 18 where it may be attenuated in 1 db steps. In operation, the operator adjusts attenuators 16 and 18 so that the output of attenuator 18, on line 45, at the frequency undergoing test, has a constant amplitude.

The signal is then directed through a broad band (5–300 MHz) amplifier 47 into mixer 50. Since the amplifier 47, as well as some other circuits within the instrument, provide gain to the signal, the attenuator 16 is calibrated in steps from −29 db to +59 db attenuation.

The frequency undergoing test is selected by the channel selector switches 25. When the operator presses one of the push button switches, this sets the frequency of a variable frequency oscillator 55, the output of which is fed into amplifier 47 and then to mixer 50. In the preferred embodiment of the invention, the variable frequency oscillator 55 is a voltage controlled oscillator (VCO), and the voltage applied thereto is determined by a frequency adjusting circuit shown generally at 60. A regulator circuit 62 provides a regulated voltage to the frequency adjusting circuit 60 which then modifies this voltage to control the frequency output of the VCO 55. The audio/video switch 30 changes the output of the regulator 62 so that either the audio or the video portion of the selected channel may be analyzed by shifting the VCO 55 to mix properly with either the video of audio carrier frequency.

The voltage controlled oscillator 55 is capable of tuning from 205 to 350 MHz. As previously mentioned, the input signal is in the range of 5 to 300 MHz. In the preferred embodiment of the invention, the incoming signals are divided into two frequency ranges: 5 to 150 MHz and 150 to 300 MHz.

For the lower frequency range, 5 to 150 MHz, the output of the VCO is varied in steps from 350 to 205 MHz and is added to the incoming signal at the mixer 50. Therefore, the output of the mixer 50 will be a constant 355 MHz.

For the higher frequency range, 150 to 300 MHz, the VCO frequency is adjusted in steps between 205 and 355 MHz, and from this is subtracted the input frequency. Therefore, the output of the mixer is a constant 55 MHz. The mixer output is applied to a switching device 65 which directs the output either to a 355 MHz band pass filter 67 or to a 55 MHz band pass filter 68. The outputs of these filters are applied to a second switching device 70 which connects the filter in use to a second mixer 75.

The channel selector 25 will determine which of the two band pass filters are employed, according to whether the input signal undergoing analysis is in the higher or lower frequency range. Both switching devices 65 and 70 are pin diode switches, each controlled by a voltage on one of two lines 71 and 72 from the channel selector 25.

A 35 MHz oscillator 80 is connected to an amplifier 82, and its output is connected to mixes 75. A 355 MHz oscillator 85 is also connected to the mixer 75 through amplifier 87. Oscillators 80 and 85 are also selected by control signals on lines 71 and 72 from the channel selector switches 25, oscillator 80 being enabled when the higher of the two frequencies range is being analyzed, and oscillator 85 being enabled when the lower of the two frequency ranges is selected.

Accordingly, mixer 75 will receive a 355 MHz signal from the switching circuit 70 along with a 355 MHz signal from amplifier 87 and oscillator 85, or it will receive the output of the 55 MHz band pass filter 68 and the 35 MHz signal from oscillator 80 and amplifier 82. In either case, the output of mixer 75 is at an intermediate frequency (20 MHz), and this output is then fed through a processing circuit shown generally at 90. This circuit includes amplifiers and 20 MHz band pass filters.

A detector circuit 95 converts the output of processing circuit 90 to a D.C. level, and this D.C. output is applied to a variable gain meter driver amplifier circuit 100. The gain of the driver circuit 100 is determined by a gain adjust or compensation circuit 105 which in turn is controlled by the channel selector switch 25.

Since the operating gain or loss characteristics of radio frequency devices vary with frequency, some compensation must be made to achieve a flat line response over the wide frequency range (5–300 MHz) for which this instrument is used. Accordingly, to achieve this flat line response, regardless of the input frequency to the instrument, the gain adjust circuit 105 is employed in conjunction with a variable gain amplifier 100 so that the current through the meter 20 will be a true reflection to the input power level and will be independent of the frequency of the signal undergoing analysis.

This device also achieves a high degree of accuracy by limiting the signal level on line 45, preferably holding this signal level at a constant value by means of attenuators 16 and 18 so that the remainder of the circuitry does not have to accommodate a wide range of voltages or currents.

Reference is now made to FIG. 3 which is an electrical schematic diagram showing details of the channel selector 25, the audio/video signal 30, the frequency adjusting circuit 60 and the gain adjusting circuit 105.

The channel selector switch 25 in the preferred embodiment of the invention includes 36 push button type switches, each including four normally-open switches "A," "B," "C" and "D" ganged together. Only one of the 36 switches is depressed or closed at any given time. Only the switches for channels T7, V and X are shown in FIG. 3, and switch CH-T7 is shown closed.

Switch contacts A select between the 355 and 55 MHz band pass filters 67 and 68 and the 335 MHz and 35 MHz oscillators, respectively. Switch contacts B are used in conjunction with the frequency-adjust circuit 60 to select the frequency of the VCO 55. Switch contacts C provide an adjustment in the VCO frequency when the audio/video selector switch 30 is in the audio position. Switch contacts D select the proper gain for the amplifier 100 at the frequency selected.

For the lower frequency range, including channels T7 to H, switch contact A and each of switches CH-T7 to CH-H connect 12 volts from line 110 to output lines 71 and 71a. Line 71 is connected to enable the 335 MHz oscillator 85, while line 71a is connected to switching circuits 65 and 70, to allow the 335 MHz signal from mixer 50 to pass through the band pass filter 67 on its way to mixer 75. For the higher frequency range, channels J to X, the switch contacts A in each of the switches CH-J to CH-X connect 12 volts from line 112 to lines 72 and 72a. Line 72 is connected to enable the 35 MHz oscillator 80, and line 72a is connected to switching circuits 65 and 70 to direct the signal from the mixer 50 through the 55 MHz band pass filter 68.

The frequency adjust circuit 60 shown in FIG. 3, includes two fixed resistors and a potentiometer. The fixed resistors are connected between ground and a regulated source of voltage on line 120 from the voltage regulator 62, a nominal 23 volts. Within the frequency adjust circuit 60, resistors R1A . . . R35A, R36A and resistors R1C . . . R35C, R36C are selected, in combination with center tapped resistors R1B . . . R35B, R36B to provide a total resistance of ½ megohm. Resistors R1A-R36A and R1C-R36C are also individually selected so that the center taps of resistors R1B-R36B are in the center of the voltage range for the proper operation of the VFO 55 at the frequency selected by the channel selector. The center tap of each of resistors R1B-R36B is connected through the normally-open switch contacts B to a buss 130. The voltage on buss 130 therefore controls the frequency output of VCO 55.

One side of each of switch contacts C is connected to buss 135 while the other side is connected through resistors R1E . . . R35E, R36E to buss 136. When the audio/video selector switch is in the audio position, as shown in FIG. 3, a 7.5 volt reference is connected to buss 136, and buss 135 is connected to a voltage divided network including potentiometer 137 and resistor 138. The position of the center tap of resistor 137 is controlled by the fine-tuning knob 32 and is connected to the voltage regulator 62 to provide a voltage change on line 120 which will cause the VCO frequency to vary by as much as ± 1 MHz when the audio/video selector switch is in the video position, resistor R40 is connected between the 7.5 volt reference and potentiometer 137 to provide a fixed voltage output from the regulator.

The gain compensation circuit 105 includes a voltage divider network including resistors 145 and 146 and adjustable potentiometers R1D . . . R35D, R36D. The center tap of each potentiometer is connected through its respective switch contact D to buss 147 and to the base of transistors Q1. The collector element of this transistor is connected to line 110 (± 12 VDC), and the output from the emitter element is connected to the variable gain amplifier 100.

FIG. 4 illustrates the digital indicator or readout charts which are associated with the attenuator controls 16 and 18, and the windows or frames 17 and 19 which outline numerals on the charts corresponding to selected values. These numerals provide the digital readout of the instrument. The attenuators are standard detented rotary switches which connect attenuating components (e.g. precision resistors) between the input terminal 12 and the wide band amplifier 47, indicated generally in FIG. 2. In operation of the instrument, the attenuators 16 and 18 are rotated until the needle of the meter 20 reaches a predetermined position, preferably a center position. Such rotation also moves the charts 16A and 18A, such that different numerals on the charts appear behind the corresponding windows 17 and 19.

Since the most commonly employed standard equates 0 dBmV to 1 millivolt (mV) across 75 ohms, the meter indication in the preferred embodiment is offset by 30 db, because it is desired that the instrument have a sensitivity to approximately −30 db. The numerical scale on chart 16A therefore is arranged to read from −2 to +5 (−20 to +50 db), and chart 18A carries both a direct reading or outer row of numbers 151, and a reverse reading, or inner row of numbers 152, line of numerals, one for each of the eleven positions of the attenuator.

The scale or chart 16A incorporates screening means which selects an appropriate one of the desired row of numerals on chart 18A, and shields the other row of numerals in the window 19. Thus, the chart 16A contains one arcuate aperture 155 which uncovers the outer row of numerals 151 on chart 18A, while the segment 156 of chart 16A outward of aperture 155 screens the inner row of numerals 152 on chart 18A from view. Therefore, when attenuator 16 is set to any positive value, in steps of 10 db, settings of attenuator 18 will read directly from the outer row of numerals on chart 18A.

A second aperture 157 is formed along a segment of the edge of chart 16A corresponding to the negative reading numerals thereon. This segment uncovers the inner row of numerals 152 on chart 18A, which is reverse reading, and the inner portion 158 of chart 16A shields from view the outer or direct reading row of numerals 151 on chart 18A. Therefore, appropriate manipulation of the two attenuators will bring into view a direct reading two-digit number within the windows 17 and 19, and this value can be read in either plus or minus db depending upon the setting for a particular input signal, as required to center the needle meter on the scale.

There are separate positions for plus and minus on chart 16A, since the actual attenuator values are different for the two zero positions on chart 18A. The plus position on chart 16A introduces attenuation of 30 db and the zero position on row 151 does not introduce any attenuation, with the unit values increasing in attenuation on a scale of one to nine. Conversely, the minus position on chart 16A provides an attenuation of 20 db and the zero position on chart 18A row 152 provides an attenuation of 10 db. Thus, for example, a readout setting of −2 db is produced by introducing attenuation of 20 db from attenuator 16 (- position) and an attenuation of 8 db from attenuator 18 (2 position on row 152).

While the method herein described, and the form of apparatus for carrying this method into effect, constitutes preferred embodiments of this invention, it is to be understood that the invention is not limited to this precise method and form of apparatus, and that changes may be made in either without departing from the scope of the invention.

What is claimed is:

1. A signal level instrument for indicating the level of an R.F. signal present in a circuit over a relatively wide range of frequency, said instrument comprising an input connection adapted to be connected to a signal source to be tested, selectively operable attenuator means connected to receive a signal from said input connection and to attenuate the received signal to a predetermined level, a channel selector adjustable to the frequency band of a particular signal being received at said input connection, said channel selector including a variable gain compensation control selected by said channel selector to provide a gain compensation related to differences in gain of the instrument circuitry at different frequencies, an indicator driven at a level corresponding to the output of said attenuator means and also compensated by a signal from said variable gain control to indicate when said attenuator means has attenuated the received signal to the predetermined level, and readout means operated by said attenuator means to indicate the amount of attenuation introduced thereby as a direct reading of incoming signal level.

2. An instrument as defined in claim 1, wherein said selector means comprises individual switches and compensation networks for each frequency band on which a test signal may be present within the range of the instrument whereby selection of a desired frequency automatically introduces appropriate compensation.

3. An instrument as defined in claim 1, including
a variable frequency oscillator,
a mixer receiving the outputs of said oscillator and said attenuator means and producing a reference output at a predetermined frequency and level,
said channel selector controlling said oscillator to vary its frequency according to the selected frequency of the signal under test.

4. An instrument as defined in claim 3, wherein the signal under test includes video and audio portions within the selected frequency band,
and switch means cooperating with said channel selector and said oscillator to shift the oscillator frequency within a selected band sufficiently to permit separate portions of the signal to be tested.

5. An instrument as defined in claim 1,
said attenuator means including a pair of individually controlled step switches and corresponding separate actuators for said switches,
said readout means including separate indicators movable by each of said actuators and coacting to display the amount of attenuation introduced digitally in ± db MV.

6. An instrument for measuring and directly indicating signal level of selected R.F. signals within a wide frequency range, such as in a cable television system, comprising
an input connector for receiving a signal under test,
manually adjustable attenuator means connected to said input connector and including readout means for indicating the amount of attenuation introduced,
a mixer receiving the attenuated signal,
a variable frequency oscillator having an output to said mixer,
channel selector means manually operable to vary the frequency of said oscillator according to the carrier frequency of the signal under test causing said mixer to produce a reference signal at a predetermined frequency and varying in level with adjustment of said attenuator means,
a meter, and
a meter driver circuit having an output to said meter and an input varying in accordance with the level of said reference signal whereby driving said meter to a predetermined condition causes said readout means to indicate directly the level of the signal under test.

7. An instrument as defined in claim 6, including a selectively adjustable gain compensation circuit controlled by said channel selector and connected to supply a gain compensation to said meter drive.

8. An instrument as defined in claim 7, said channel selector means including a separate switch for each channel, and said gain compensation circuit including individual compensation components for each channel connected to a corresponding selector switch whereby selection of a channel automatically introduces gain compensation appropriate to that channel.

9. An instrument as defined in claim 6, including a manually operable selector switch means connected to said channel selector means and operable to shift the frequency of said oscillator between different carrier frequencies within a band of frequencies selected by operation of said channel selector means.

10. An instrument as defined in claim 9, wherein said oscillator is a voltage controlled oscillator, said channel selector means provides predetermined control voltages to said oscillator corresponding to different frequency bands, and said selector switch means provides a further change in the control voltage.

11. An instrument as defined in claim 6, wherein said mixer operates to provide selectively reference signals at different frequencies,
filter circuits receiving respective ones of said reference signals,
switching means operated from said channel selector means and connected to activate the appropriate filter circuit according to the selected frequency of the signal under test,
a second mixer receiving the output of said filter circuits and providing a reduced frequency reference output to said meter driver,
selectively operable fixed frequency oscillators connected to said second mixer,
and said switching means having actuating connections to said fixed frequency oscillators to actuate that oscillator corresponding to the selected filter circuit whereby the output of said second mixer is the same predetermined frequency with any one of the filter circuits in use.

12. The method of testing the level of R.F. signals present over a wide range of frequency in a transmission system, comprising the steps of
attenuating the signal under test,
producing from the attenuated signal a reference signal at a predetermined reference level,
compensating the reference signal for frequency,
driving a signal level responsive indicator to a predetermined position with the compensated reference signal by adjusting the amount of attenuation until the attenuated signal is at a predetermined level corresponding to the predetermined indicator position,
and producing from the attenuating step a direct reading of the amount of attenuation introduced as a measure of the level of the signal under test.

* * * * *

UNITED STATES PATENT AND TRADEMARK OFFICE
CERTIFICATE OF CORRECTION

PATENT NO. : 3,908,165
DATED : September 23, 1975
INVENTOR(S) : Jack D. Cauldwell It is certified that error appears in the above–identified patent and that said Letters Patent are hereby corrected as shown below:

Column 1, line 6, "R.E." should be --R.F.--; same column, line 56, "especially" should be --usually--.

Column 5, line 23, "of" should be --or--.

Column 6, line 30, "signal" should be --switch--; line 36, "given" should be --one--.

Column 10, line 5, after "separate" insert --selector--.

Signed and Sealed this thirteenth Day of April 1976

[SEAL]

Attest:

RUTH C. MASON
Attesting Officer

C. MARSHALL DANN
Commissioner of Patents and Trademarks